UNITED STATES PATENT OFFICE.

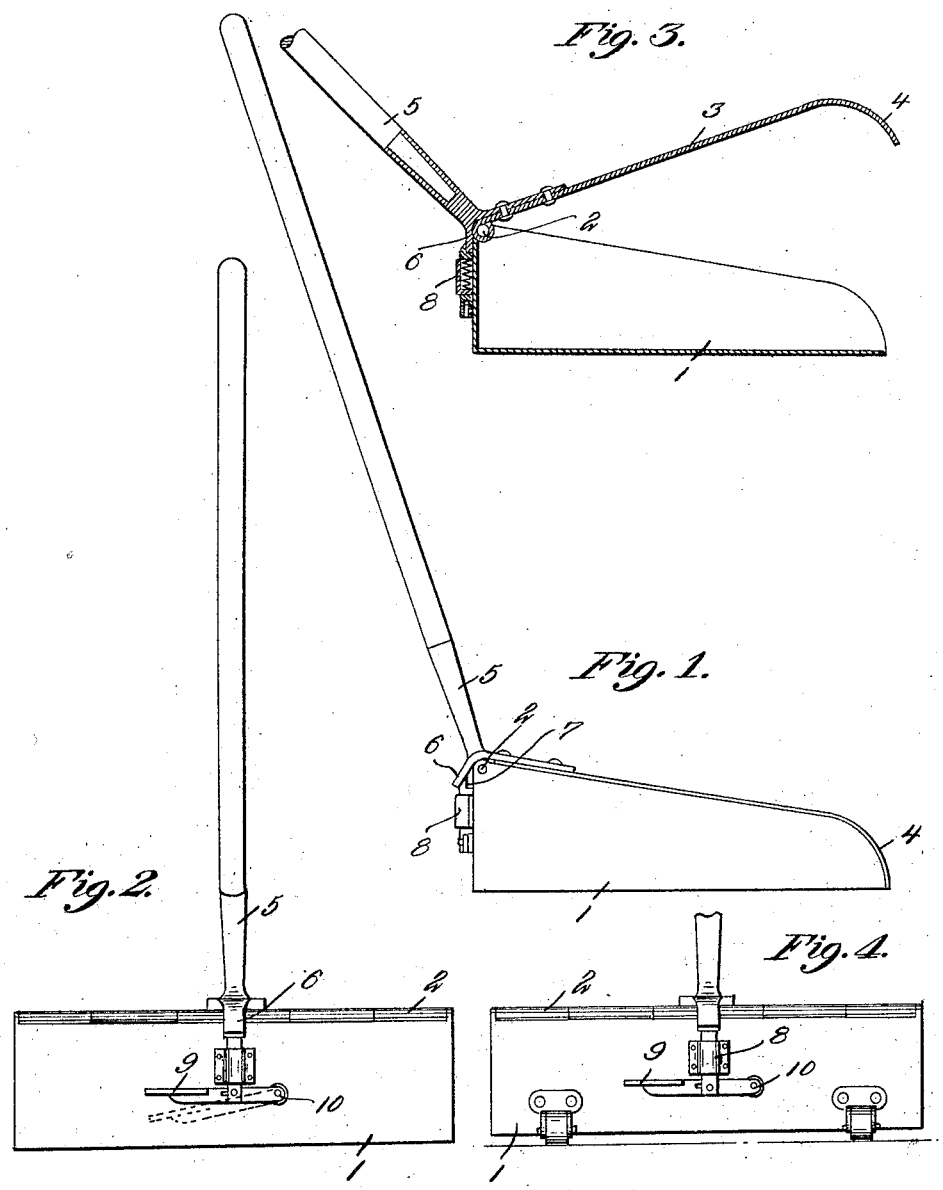

MOISE CHARLES CHAGNON, OF DERBY, CONNECTICUT.

DUSTPAN.

1,410,369. Specification of Letters Patent. Patented Mar. 21, 1922.

Application filed November 7, 1921. Serial No. 513,437.

*To all whom it may concern:*

Be it known that I, MOISE CHARLES CHAGNON, a citizen of the United States, residing at Derby, in the county of New Haven and State of Connecticut, have invented new and useful Improvements in Dustpans, of which the following is a specification.

My present invention has reference to an improvement in dust pans.

My object is to produce a covered dust pan in which the handle for the pan when tilted will bring the cover thereof to open position.

A further object is to produce a dust pan designed to lighten the burden of a housewife in which the said pan is normally closed by a cover to which is secured the handle for the dust pan, latching means engaging the handle for holding the same in one position and the cover in closed position, means also engaging with the handle to hold the same at a different inclination with respect to the pan and to hold the cover in open position when the pan is to receive the dust, both of said means being of a nature whereby the cover is held positively closed or open and the handle supported in a manner whereby the pan can be readily moved when the cover thereof is either open or closed.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of the improvement.

Figure 2 is a rear elevation thereof.

Figure 3 is a sectional view on the line 3—3 of Figure 2, the cover being in open position.

Figure 4 is a rear elevation illustrating a slight modification.

Referring now to the drawings in detail, the numeral 1 designates a dust pan of the ordinary construction. Hinged, as at 2, to the upper edge at the back of the pan there is a cover 3. The cover 3 has its outer end formed with a downturned lip 4 to engage with the bottom of the pan to effectively hold the dust which has been collected in the pan.

Secured to the cover 3, at the hinged portion thereof there is a handle 5. This handle has a rearwardly extending downwardly disposed finger 6. The angle finger 6 has, on its inner face a straight extension 7 that is in contact with the rear straight wall of the pan 1, and that provides a substantially V-shaped opening between the finger and extension. The numeral 8 designates a spring influenced latch which is arranged for vertical movement in a suitable casing. The active end of the latch presents an inner straight face and an outer inclined face, both of which respectively contact with the inner face of the finger 7 and the outer face of the element 8 when the cover is to be retained closed on the pan.

Pivoted, as at 10 to the back of the pan 1 there is a lever 10, the said lever having a loose pivoted connection with the latch and having its free end offset to provide a pedal 19. It will be apparent that a pressure on the pedal will influence the latch to bring the same out of contact with the elements 6 and 7, thus permitting the handle to be turned to swing the cover 4 to open position, and upon release of the pedal the spring influenced latch will move to bring the inner straight face into contact with the outer face of the finger 6 to hold the cover 3 open, in the position illustrated in Figure 3 of the drawings. It will thus be noted that the latch effectively holds the cover 3 in both its open and closed positions.

If desired, and as disclosed in Figure 4 of the drawings the dust pan may be mounted on wheels.

Having described the invention, I claim:—

The combination in a dust pan having a cover hinged to the upper edge of the rear thereof and a handle secured on the cover at its said hinged end, of means for holding the cover open or closed in accordance with the angular position of the handle with respect to the pan, comprising an angularly arranged downwardly disposed finger at the juncture of the handle with the cover, a straight element on the inner face of the finger, but spaced therefrom, a spring influenced latch mounted for movement on the back of the pan having its active end presenting a straight and an angle surface which contact with the outer face of the straight element and the inner faces of the angle finger respectively when the cover is in closed position, and the straight surface of the latch designed to contact with the outer face of the angle finger when the handle is swung to bring the latter against the rear of the pan, and pivoted means for operating the latch.

In testimony whereof I affix my signature.

MOISE CHARLES CHAGNON.